(12) United States Patent
Bonomi

(10) Patent No.: US 11,131,405 B1
(45) Date of Patent: Sep. 28, 2021

(54) ANGLE BALL VALVE HAVING INTEGRATED SENSOR

(71) Applicant: Vittorio Bonomi, Fort Lauderdale, FL (US)

(72) Inventor: Vittorio Bonomi, Fort Lauderdale, FL (US)

(\*) Notice: Subject to any disclaimer, the term of this patent is extended or adjusted under 35 U.S.C. 154(b) by 0 days.

(21) Appl. No.: 16/813,797

(22) Filed: Mar. 10, 2020

(51) Int. Cl.
  *F16K 37/00* (2006.01)
  *F16K 5/06* (2006.01)
  *F16K 27/06* (2006.01)
  *G01K 1/14* (2021.01)

(52) U.S. Cl.
  CPC ............ *F16K 37/005* (2013.01); *F16K 5/061* (2013.01); *F16K 5/0657* (2013.01); *F16K 5/0684* (2013.01); *F16K 5/0689* (2013.01); *F16K 27/067* (2013.01); *F16K 37/00* (2013.01); *G01K 1/14* (2013.01)

(58) Field of Classification Search
  CPC ...... F16K 5/061; F16K 5/0605; F16K 5/0642; F16K 27/067; F16K 37/005; F16K 37/0025; F16K 37/00
  See application file for complete search history.

(56) References Cited

U.S. PATENT DOCUMENTS

| 3,463,451 | A | \* | 8/1969 | Treadwell | ............ | F16K 5/0657 |
| | | | | | | 251/315.14 |
| 3,951,380 | A | \* | 4/1976 | Oliva-Bonino | ....... | F16K 5/0642 |
| | | | | | | 251/304 |
| 4,020,864 | A | | 5/1977 | Church, Jr. | | |
| 5,560,392 | A | | 10/1996 | Spang et al. | | |
| 5,588,462 | A | | 12/1996 | McHugh | | |
| 5,735,047 | A | \* | 4/1998 | Evans | ..................... | F16K 5/201 |
| | | | | | | 29/890.13 |

(Continued)

FOREIGN PATENT DOCUMENTS

| CN | 2466450 Y | | 12/2001 | | |
| DE | 3508570 A1 | \* | 9/1985 | ............... | G01K 1/14 |

(Continued)

OTHER PUBLICATIONS

Krueger, "Piping Packages for Chilled and Hot Water Fan Coil Units," Product Brochure, Jul. 2016; Krueger-HVAC, Richardson, Texas; www.krueger-hvac.com; pp. 1-20.

(Continued)

*Primary Examiner* — David Colon-Morales
(74) *Attorney, Agent, or Firm* — Allen, Dyer, Doppelt + Gilchrist, P.A.

(57) ABSTRACT

An angle ball valve includes a housing, valve chamber, and first and second fluid ports. A hollow ball is disposed within the valve chamber and in abutment to sealing elements, and includes a first surface opening and second surface opening and is rotatable within the valve chamber about an axis of ball rotation between open and closed ball valve positions. A first sensor orifice is formed within the valve housing coaxial with the axis of ball rotation and receives a sensor, which extends into a second sensor orifice of the ball. A valve stem is operatively connected to the ball and extends along the axis of ball rotation opposite the first sensor orifice. The valve stem rotates the ball into and out of open and closed ball valve positions.

14 Claims, 12 Drawing Sheets

(56) References Cited

U.S. PATENT DOCUMENTS

| | | | | |
|---|---|---|---|---|
| 5,735,307 | A | * | 4/1998 | Charron ................. F16K 5/0642 137/270 |
| 5,904,292 | A | * | 5/1999 | McIntosh ........... G05D 23/1393 236/37 |
| 5,992,823 | A | * | 11/1999 | Hung-Lin ................ F16K 5/061 251/315.1 |
| 6,039,304 | A | | 3/2000 | Carlson et al. |
| 6,199,824 | B1 | * | 3/2001 | Lee ......................... F16K 5/061 251/315.01 |
| 6,488,261 | B1 | * | 12/2002 | Lee ......................... F16K 5/061 251/174 |
| 6,681,802 | B2 | * | 1/2004 | McHugh ............. F16K 11/0873 137/559 |
| 7,631,662 | B2 | * | 12/2009 | Reck .................... F16K 5/0605 137/625.47 |
| 8,413,684 | B2 | * | 4/2013 | Thomas ................ F16K 5/0642 137/625.41 |
| 8,955,763 | B2 | * | 2/2015 | Zirkiyev ............ G05D 23/1923 237/8 A |
| 9,377,230 | B2 | * | 6/2016 | Perez ...................... F24D 17/02 |
| 9,677,717 | B2 | * | 6/2017 | Jenks .................. F16K 11/0873 |
| 9,857,805 | B2 | | 1/2018 | Halimi |
| 10,072,856 | B1 | | 9/2018 | Akin et al. |
| 10,295,387 | B2 | | 5/2019 | Bonomi |
| 10,302,521 | B2 | * | 5/2019 | Hoffman ................ F25B 45/00 |
| 2005/0252560 | A1 | * | 11/2005 | Anderson ............. F16K 27/067 137/625.47 |
| 2007/0215828 | A1 | * | 9/2007 | Cellemme, Jr. ....... F16K 5/0642 251/148 |
| 2008/0083231 | A1 | | 4/2008 | Wang |
| 2008/0164006 | A1 | * | 7/2008 | Karamanos ............ B23P 15/26 165/67 |
| 2009/0165866 | A1 | | 7/2009 | Fima |
| 2010/0078080 | A1 | * | 4/2010 | Vehmeier ............... F16K 5/0605 137/455 |
| 2014/0305154 | A1 | * | 10/2014 | Yoshioka ................ F25B 41/37 62/324.6 |
| 2018/0283706 | A1 | * | 10/2018 | Chen ................... F24D 19/1084 |
| 2018/0306617 | A1 | * | 10/2018 | Bonomi .................... F16K 5/06 |
| 2019/0078692 | A1 | | 3/2019 | Bonomi et al. |
| 2019/0285186 | A1 | | 9/2019 | Tanghetti et al. |
| 2019/0301650 | A1 | | 10/2019 | Bonomi |

FOREIGN PATENT DOCUMENTS

| | | | | |
|---|---|---|---|---|
| DE | 3428913 | A1 | * 10/1985 | ............. G01K 13/02 |
| DE | 3809288 | C1 | * 2/1989 | .......... F16K 37/005 |
| DE | 4407689 | A1 | * 8/1994 | ........ F24D 19/1015 |
| EP | 2295837 | A1 | * 3/2011 | ............. G01K 13/02 |
| GB | 1059273 | A | * 2/1967 | .......... F16K 5/0657 |
| KR | 10-0698930 | B1 | 3/2007 | |
| KR | 10-1445269 | 81 | 9/2014 | |

OTHER PUBLICATIONS

Neptronic, "What's the Difference? 2 Pipe vs. 4 Pipe Fan Coil," Neptronic Technical Brochure; Jul. 16, 2015; www.neptronic.com; pp. 1-5.

* cited by examiner

ANGLE BALL VALVE HAVING INTEGRATED SENSOR

FIELD OF THE INVENTION

The present invention relates to the field of ball valves, and more particularly, this invention relates to an angle ball valve having a sensor that measures a physical parameter of fluid such as temperature.

BACKGROUND OF THE INVENTION

Many heating, ventilation, and air conditioning (HVAC) systems use different piping packages that include pipes, valves, flexible hoses, and fittings that connect different distributed piping units in a building. These piping packages provide for the supply and return of hot water, chilled water, or refrigerant gas to HVAC coils and related HVAC components. Different HVAC components and systems are used depending on the HVAC system design, including convection heating systems, forced-air systems using various types of heat exchangers, and systems that employ HVAC air coils. Vertical fan units and similar HVAC designs are commonly used in many industrial, commercial and residential buildings and may include a heating and/or cooling heat exchanger, e.g., a "coil" and its associated fan. Other related HVAC systems use district cooling and heating, central heating and/or chilled water systems.

Different piping package designs may be installed by different manufacturers, such as in vertical fan units or other HVAC units. These systems sometimes operate as submeter applications that require a BTU meter to measure individual energy consumption and permit individual consumers to be billed for individual measured utility usage. Submeter applications often vary in design, with some systems having a two pipe, fan coil system with a single water coil connected to two pipes as a supply and return and one valve. Other systems have a four pipe, fan coil system with two separate cooling and heating water coils and dedicated supply and return pipes and valves. These systems include piping packages that are assembled with pipes, valves, flexible hoses, and fittings that connect terminal units of the distributed piping in a building and provide supply and return of hot water, chilled water, or refrigerant gas to HVAC coils, and depending on design, may be designed with or without metering devices. However, in many designs, metering devices are preferred, e.g., a BTU meter.

In piping assemblies that are configured for use with vertical fan units and similar HVAC units, there is usually some friction or head loss in the middle of the air duct because the different valves, meters, pipes, flexible hoses and fittings are positioned within the air path of either the air discharge, the air intake or both. The footprint of the HVAC unit and its components, for example, in a vertical fan unit, cannot be changed since the unit design does not permit these types of changes. There are also dimensional constraints for placement of the unit, making it difficult or impossible to change the footprint.

For example, a vertical fan unit may be dimensioned to fit within a particular location of a building, such as a specific corner of an apartment located within a high rise residential complex. In these close confines, it becomes difficult to service the valves and fittings, and difficult to maintain the different components, and even more difficult to replace some components after normal wear and tear because of the close confines of the system design. Because of the constraints in the system design, for example, in a vertical fan unit, there is usually some high friction, e.g., high head loss, as the air is blown or drawn over different components of the piping package. This creates inefficiency in the HVAC unit operation, increases energy consumption, raises costs of operation, and increases maintenance time and costs.

Some customers request more compact or smaller system and/or component designs for the control and related valves, the fittings, the hoses, the meters, e.g., a BTU meter such as used in heating/cooling submeter applications, to facilitate inspection and maintenance. This is difficult in many system designs since the HVAC units have dedicated piping packages that are incorporated in the HVAC units. It is not possible to change unit dimensions and it would not be advantageous to avoid the pressure loss, also termed friction loss, due to the air resistance caused by so many components and parts making up the piping package that are located in the middle of the air duct. It is thus desirable to avoid the high pressure or head loss inside these different HVAC units, for example, a vertical fan unit, where the many components of a piping package interfere with the natural flow of air through the HVAC unit and its associated coil. Reducing the friction loss would reduce the load on the fan motor, which otherwise could be loaded to excess in order to move the same amount of air through the coil, thus increasing energy consumption and reducing the life of the motor.

Besides minimizing the number of valves, hoses, and meters that may interfere with the air flow, for example, in a vertical fan unit, some manufacturers have attempted to solve some of these issues by changing valves designs. For example, some ball valves have been designed to incorporate temperature sensors in an attempt to make the overall piping packages more compact and aid temperature sensing between supply and return lines in some HVAC systems.

The ball valves disclosed in both Chinese Patent No. 2466450 and U.S. Pat. No. 5,588,462 incorporate temperature sensors, but use straight through flow designs that are conventional, and still may increase overall size. Another example is the ball valve disclosed in Korean Patent No. KR101445269, which incorporates a temperature sensor and is angled to minimize space. It includes two fluid ports and allows the ball valve to be installed in a more narrow space than some conventional ball valves and associated components used in more conventional piping packages. This ball valve disclosed in the Korean '269 patent incorporates a manual handle located at the top of the valve. This configuration may be impractical for some vertical fan units and related designs, where the top handle to turn the valve off and on is impractical to reach.

That valve also includes a temperature probe, but its sensor may interfere with the ball valve rotation, because the ball requires a long cut as a circumferentially extending slot that covers a large segment of the outer surface of the ball. That type of design compromises the ball valve operation, makes assembly more difficult, and requires utmost care in its manual assembly. That design also does not lend itself to long-lasting performance and the slot design and placement of the temperature and gaskets compromise the life of the valve, and over time, gasket tears may occur, resulting in greater fluid leakage and fluid consumption. Once the gaskets are torn or damaged, the floating ball may be damaged or move out of axis. Overall, that type of ball valve may not withstand the higher pressures associated with some HVAC systems, increasing even more the possibility of gasket tears or that the "floating ball" will move and go out of axis.

SUMMARY OF THE INVENTION

This summary is provided to introduce a selection of concepts that are further described below in the Detailed Description. This summary is not intended to identify key or essential features of the claimed subject matter, nor is it intended to be used as an aid in limiting the scope of the claimed subject matter.

An angle ball valve may include a valve housing having a valve chamber and first and second fluid ports formed within the valve housing and communicating with the valve chamber and defining a fluid path between the first and second fluid ports. The first and second fluid ports may be disposed substantially normal to each other and oriented along respective first and second longitudinal axes and forming a first transverse plane to the valve housing. The valve housing has a closed end opposite the second fluid port. First and second annular configured sealing seats are formed within the valve housing at the valve chamber and concentric to the second longitudinal axis. The first annular configured sealing seat is adjacent the closed end of the valve housing and the second annular configured sealing seat is adjacent the second fluid port.

A sealing element is positioned at each annular configured sealing seat. A hollow ball is disposed within the valve chamber and in abutment to the sealing elements. The ball has a first surface opening and second surface opening and is rotatable within the valve chamber about an axis of ball rotation that is transverse to first and second longitudinal axes between open and closed ball valve positions. In an open ball valve position, the first surface opening is aligned with the first fluid port and the second surface opening is aligned with the second fluid port to allow fluid flow between first and second fluid ports through the ball. In a closed position, fluid flow is prevented between the first and second fluid ports.

A first sensor orifice is formed within the valve housing coaxial with the axis of ball rotation. The ball has a second sensor orifice into which the axis of a sensor extends when received in the first sensor orifice to measure a physical parameter of fluid flowing between first and second fluid ports when the ball is rotated into an open ball valve position. A stem orifice is formed within the valve housing opposite the first sensor orifice and coaxial with the axis of ball rotation. A valve stem is received within the stem orifice and operatively connected to the ball. The valve stem is rotatable to rotate the ball into and out of open and closed ball valve positions.

In an example, the first fluid port may be configured as a fitting adapted to connect to a flexible hose or air coil of a heating, ventilation and cooling (HVAC) system. The second fluid port may be configured as a fitting to connect to a BTU meter. The first and second fluid ports may be angled about 90 degrees to each other along respective first and second longitudinal axes that are transverse to each other. Each sealing element may comprises a gasket. Each gasket may comprise Polytetrafluoroethylene (PTFE) and the ball has a surface coated with PTFE.

The axis of ball rotation may define a third longitudinal axis that is transverse to first and second transverse longitudinal axes, and wherein the longitudinal axes define respective x, y and z axes. The fluid may comprise a gas or liquid. In another example, the ball includes a periphery having an outer slit, and the valve stem includes a projection that engages the outer slit for rotating the ball along the axis of rotation. The valve stem may include an annular abutment positioned within the valve chamber that engages a periphery of the stem orifice within the valve chamber to prevent removal of the valve stem outward from the valve housing. A temperature sensor may be received within the first sensor orifice and extend into the second sensor orifice of the ball for sensing the temperature of fluid flowing through the ball when in the open ball valve position.

In yet another example, an angle ball valve may include a valve housing having a valve body and an end adapter secured thereto, and forming a valve chamber. A first fluid port is formed within the valve housing and communicates with the valve chamber and a second fluid port is formed within the end adapter and defines a fluid path between the first and second fluid ports, which may be disposed substantially normal to each other and oriented along respective first and second longitudinal axes forming a first transverse plane to the valve housing. The valve body has a closed end opposite the second fluid port. A first annular configured sealing seat is formed within the valve body at the valve chamber and concentric to the second longitudinal axis. The first annular configured sealing seat is adjacent the closed end. A second annular configured sealing seat is formed within the end adapter adjacent the second fluid port and concentric to the second longitudinal axis. An gasket is positioned at each annular configured sealing seat.

A hollow ball is disposed within the valve chamber and in abutment to the gaskets. The ball has a first surface opening and second surface opening and is rotatable within the valve chamber about an axis of ball rotation between open and closed ball valve positions. In an open ball valve position, the first surface opening is aligned with the first fluid port and the second surface opening is aligned with the second fluid port to allow fluid flow between first and second fluid ports through the ball. In a closed ball valve position, fluid flow is prevented between the first and second fluid ports.

A first sensor orifice is formed within the valve body coaxial with the axis of ball rotation. The ball has a second sensor orifice through which the axis of a sensor extends. A temperature sensor is received within the first sensor orifice and extends into the second sensor orifice of the ball for sensing the temperature of fluid flowing through the ball when in the open ball valve position. A stem orifice is formed within the valve body opposite the first sensor orifice and coaxial with the axis of ball rotation. A valve stem is received within the stem orifice and operatively connected to the hollow ball, wherein the valve stem is rotatable to rotate the ball into and out of open and closed ball valve positions. The first sensor orifice and stem orifice define sides of the valve housing for a side mounted valve stem.

A handle may be connected to the valve stem and configured to allow manual rotation of the ball between the open and closed ball valve positions. In another example, an electric actuator may be connected to the valve stem and configured to rotate the ball between the open and closed ball valve positions.

BRIEF DESCRIPTION OF THE DRAWINGS

Other objects, features and advantages of the present invention will become apparent from the Detailed Description of the invention which follows, when considered in light of the accompanying drawings in which.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
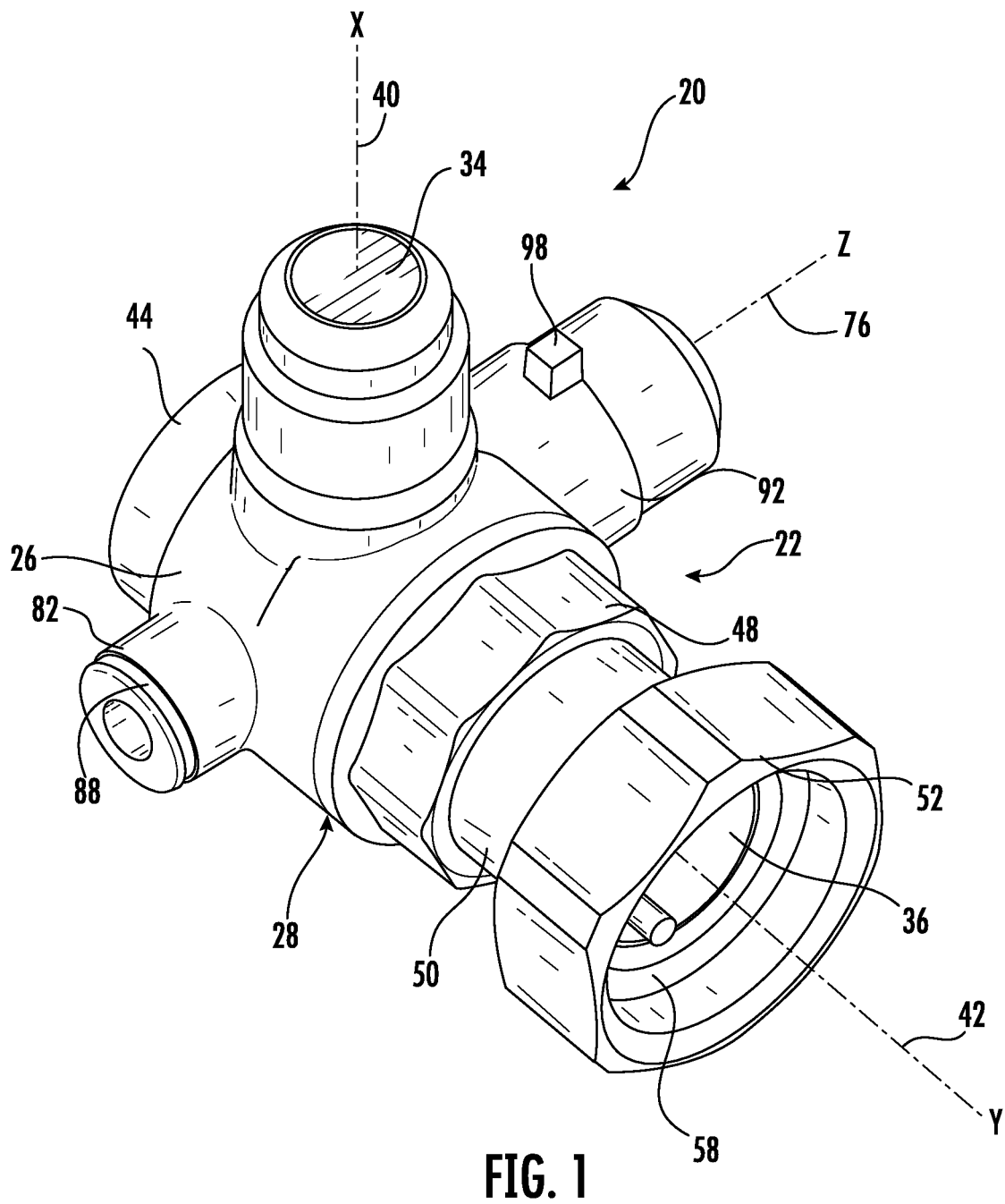
FIG. 1 is an isometric view of the angle ball valve of a first embodiment.
Figure 2:
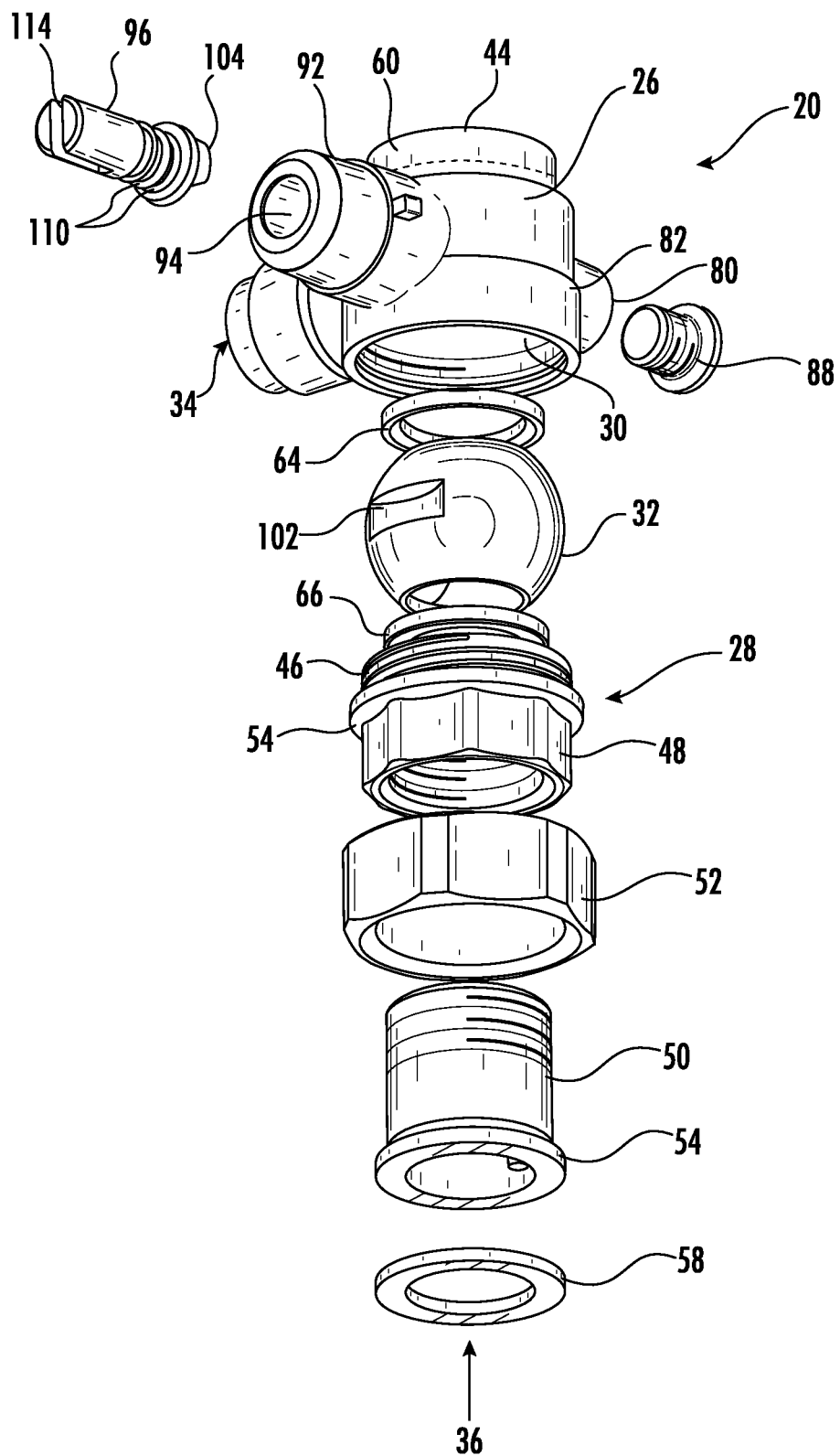
FIG. 2 is an exploded isometric view of the angle ball valve of FIG. 1.

Referring now to FIGS. 1-8, there are illustrated different views of a first embodiment of the angle ball valve shown generally at 20. The angle ball valve 20 in this example includes a valve housing 22 formed as a two-piece valve housing that includes a generally cylindrically configured valve body 26 and an end adapter 28 secured thereto and forming together a valve chamber 30 within the valve housing into which a valve is seated, which as explained below is formed as a hollow ball 32 (FIG. 2). A first fluid port 34 is formed within the valve housing 22 and communicates with the valve chamber 30, and a second fluid port 36 is formed within the end adapter 28 and defines a fluid path between the first and second fluid ports 34,36 through the valve chamber 30. In this example, the first and second fluid ports 34,36 are disposed substantially normal to each other and oriented about respective first and second longitudinal axes 40,42 indicated generally by the dashed lines in FIG. 1 forming a first transverse plane to the valve housing 22. The first and second fluid ports 34,36 are angled about 90° to each other along respective first and second longitudinal axis 40,42 that are transverse to each other. The valve body 26 has a closed end 44 opposite the second fluid port 36 as shown best in FIG. 3 and in the sectional view of FIG. 7. When installed in many HVAC systems, the angle ball valve 20 may be positioned such that the closed end 44 is the top section or side section relative to the HVAC unit, while the end adapter 28 and second fluid port 36 may be positioned as the lower or side section of the valve housing 22, as non-limiting examples.

In this example, the first fluid port 34 may be configured as an end fitting that may connect to a hose of a coil or isolation valve of a HVAC system or directly to a copper pipe. The second fluid port 36 may be configured on the end adapter as an end fitting to connect directly to a BTU meter in this example. The end adapter 28 may be configured to screw into the valve body 26 and includes a threaded male connector 46 and an outer perimeter section 48 configured to receive a wrench to tighten the end adapter into the valve body. As illustrated, a cylindrically configured joint member 50 is received within the end adapter 28 opposite the threaded male connector 46 such as by a press fit or via threads and into the end adapter. The joint member 50 receives a nut 52 over the cylindrical section or body forming the joint member, which includes a lower circumferential ridge 54 or shoulder extending outward that acts as a retainer and engages an internal lip or shoulder 56 formed on the nut to retain the nut on the joint member 50 when the joint member 50 is received and secured within the end adapter 28. The nut 52 has internal threads that may connect directly to a BTU meter and retain the BTU meter in a connection similar to a nut and tail end connection, so that the angle ball valve 20 can be connected to the BTU meter without the necessity of additional fittings and/or joint connection. A joint member gasket 58 or other sealing element may engage the outer perimeter section of the lower circumferential ridge 54 or shoulder and form a seal to a BTU meter.

In the embodiment shown in FIG. 1, the first and second fluid ports 34,36 are angled about 90° to each other along respective first and second longitudinal axes 40,42 that are substantially transverse to each other. As illustrated by the dashed lines in FIGS. 3, 5 and 6 and the sectional view of FIG. 7, a first annular configured sealing seat 60 is formed within the valve body 26 at end of the valve chamber 30 adjacent the closed end 44 and formed concentric to the second longitudinal axis 42 defined by the second fluid port 36. This first annular configured sealing seat 60 is configured similar to a second annular configured sealing seat 62 formed within the end adapter 28 adjacent the second fluid port 36 on the interior, annular section defined by the threaded male connector 46 and also concentric to the second longitudinal axis 42. These first and second annular configured sealing seats 60,62 form a valve seat for the hollow ball 32 that operates as the valve of the angle ball valve 20. A sealing element is positioned at each of the first and second annular configured sealing seats 60,62, and in this example, the sealing elements are formed as respective first and second gaskets, i.e., first and second respective gaskets 64,66 that are configured to fit within the respective first and second annular configured sealing seats 60,62. It should be understood that it is possible to use other sealing elements positioned at each annular configured sealing seat to form a seal for the hollow ball 32, which operate as a "floating" ball and configured to rotate on the gaskets 64,66 at the sealing seats 60,62 when positioned within the valve chamber 30 and in abutment to the gaskets 64,66, which with the sealing seats form a valve seat.

Figure 3:
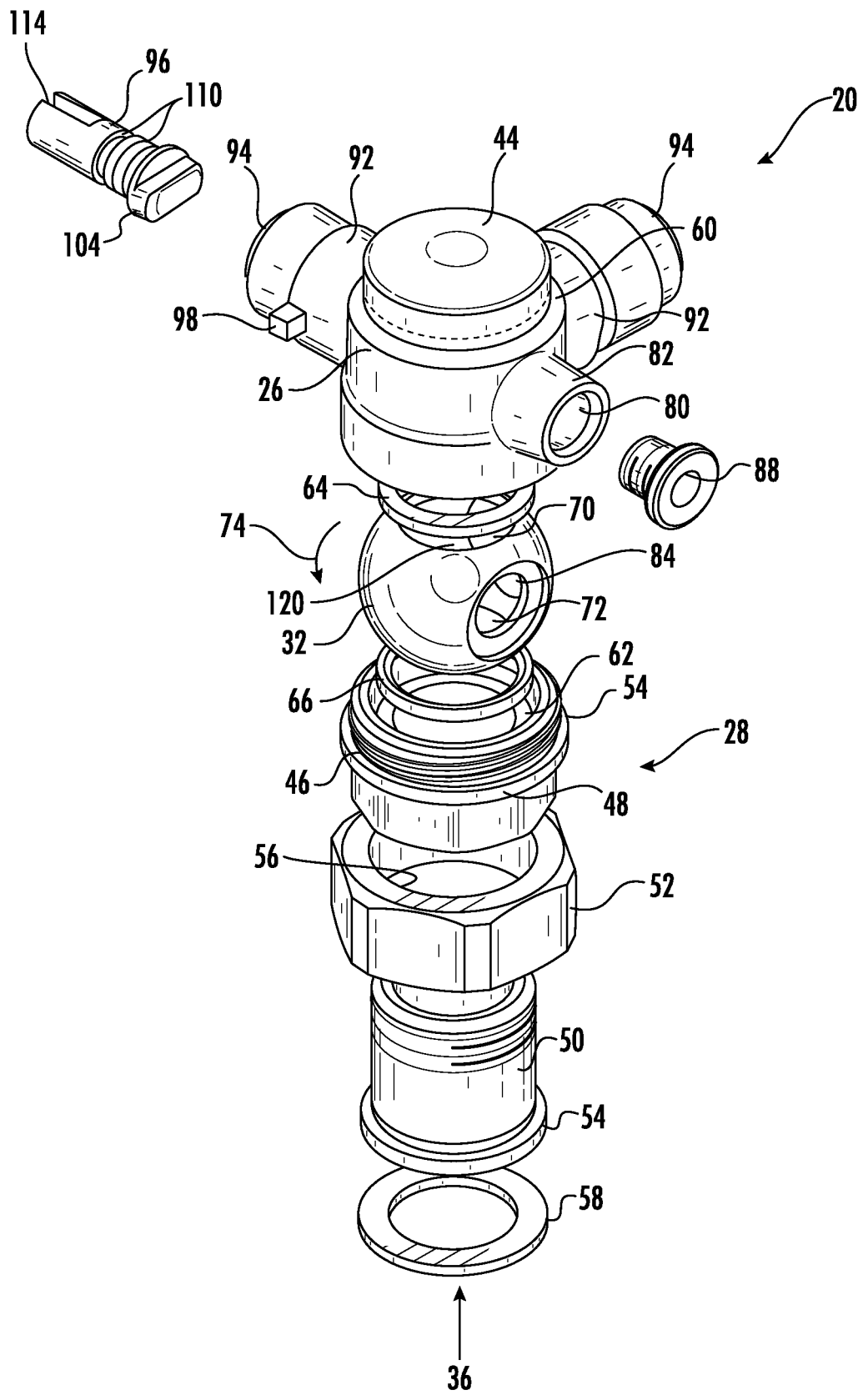
FIG. 3 is another exploded isometric view of the angle ball valve of FIG. 1.

As illustrated, the hollow ball 32 is disposed within the valve chamber 30 at the valve seat and in abutment to the first and second gaskets 64,66. The hollow ball 32 has a spherical outer surface with planar cuts forming a first surface opening 70 and a second surface opening 72. The hollow ball 32 is mounted within the valve seat defined by the first and second gaskets 64,66 and is rotatable within the valve chamber 30 about an axis of ball rotation that is transverse to the first and second longitudinal axes 40,42 between open and closed ball valve positions. In the open ball valve position, the first surface opening 70 is aligned with the first fluid port 34 and the second surface opening 72 is aligned with the second fluid port 36 to allow fluid flow between first and second fluid ports through the hollow ball. In a closed ball valve position, fluid flow is prevented between the first and second fluid ports 34,36 because a closed surface section of the hollow ball that has no opening or other orifices blocks fluid flow into or out of one of the fluid ports, which in the example of FIG. 3, is shown to block the second fluid port 36 when the ball is rotated in the direction of the arrow shown at 74. In this example, the first and second fluid ports 34,36 are angled at about 90° to each other along respective first and second longitudinal axes 40,42 that are transverse to each other. The axis of ball rotation defines a third longitudinal axis 76 (FIG. 1) that is transverse to the first and second longitudinal axes 40,42, wherein the longitudinal axes define respective x, y and z axes for the angle ball valve 20.

A first sensor orifice 80 is formed within the valve body 26 in axial alignment, the orifice being coaxial with the axis of ball rotation as defined by the third longitudinal axis 76. A cylindrical or barrel shaped support section 82 extends outward from the generally cylindrical configured valve body 26 and includes the first sensor orifice 80 as a bore extending therethrough. The diameter of this first sensor orifice 80 can be small enough to receive a sensor probe that may be only a few millimeters in diameter, depending on the size of the angle ball valve 20. The hollow ball 32 includes a second sensor orifice 84 into which the axis of a sensor or probe such as a temperature sensor extends into when the sensor is received in the first sensor orifice 80, and extends into the hollow ball 32 via the second sensor orifice to measure a physical parameter of the fluid flowing between first and second fluid ports 34,36 when the ball is rotated into an open ball valve position. In an example, the sensor is formed as a longitudinally extending probe shown at 86 in FIG. 4, e.g., a temperature sensor, that is of a sufficiently narrow diameter that it may be received into the second sensor orifice 84 of the hollow ball 32 for measuring the temperature of the fluid flowing through the ball between first and second fluid ports 34,36 when the ball is in the open valve position. The temperature probe 86 can be a small diameter probe made from a rigid material and a few millimeters or greater in diameter so that the second sensor orifice 84 formed in the hollow ball 32 is a small diameter also.

In the illustrated examples of FIGS. 2, 3, and 5-8, a sensor orifice plug or tap 88 as it is sometimes referred is inserted within the first sensor orifice 80 when the temperature probe or sensor is not used. This plug or tap 88 includes a gasket 90 to provide a seal to the first sensor orifice 80 and for the angle ball valve 20 when a temperature sensor 86 or other probe for sensing a physical parameter of the fluid is not used, and this prevents leakage of fluid out of the first sensor orifice 80. It should be understood that the fluid may be a gas or a liquid that can be measured and the angle ball valve 20 may operate with different gases or liquids for different HVAC and similar applications.

The temperature sensor 86 formed as a probe is received within the first sensor orifice 80 and extends through the second sensor orifice 84. On the opposite side of the valve body 26 from the first cylindrical support section 82 that includes the first sensor orifice 80 is yet another, but larger second cylindrical support section 92 that includes a stem orifice 94 formed within the valve body 26 opposite the first sensor orifice 80 and extending also along the axis of ball rotation that forms the third longitudinal axis 26, i.e., coaxial with that axis of ball rotation. A valve stem 96 is received within the stem orifice 94 and operatively connected to the ball 32. The valve stem 96 is rotatable to rotate the ball 32 into and out of open and closed ball valve positions. In this example, the first sensor orifice 80 and stem orifice 96 are positioned at opposite sides of the generally cylindrically configured valve housing 22, resulting in a side mounted valve stem and temperature probe as illustrated in FIG. 1 and subsequent figures. The second cylindrical support section 92 that receives the valve stem 96 includes tabs formed as mounting members 98 that may be configured to receive and have directly mounted thereon an electric actuator, such as shown by the dashed lines 100 in FIG. 11, where the angle ball valve is shown as part of a HVAC system as explained in greater detail below. The electric actuator 100 engages the valve stem 96 and controls rotation of the valve stem, and thus controls rotation of the ball 32 between open and closed ball valve positions, which in one example is a 90° rotation.

As shown in FIGS. 2-6, the ball 32 includes its spherical outer surface and has an outer slit 102 formed therein, but not extending all the way through the spherical outer surface so that the slit does not communicate with the interior of the hollow ball 32. The valve stem 96 includes at its end that extends into the valve chamber 30 and engages the hollow ball 32, a rectangular configured projection 104 that engages the outer slit 102 so that when the valve stem 96 is turned, the valve stem rotates the ball along the axis of rotation defined by the third longitudinal axis 76. The valve stem 96 includes an annular abutment 108 at this end and positioned within the valve chamber 30 to engage the interior periphery of the stem orifice 94 on the inside surface of the valve body 26 defining the valve chamber 20 to prevent removal of the valve stem 96 outward from the valve body 21.

During assembly of this angle ball valve 20, before the end adapter 28, joint member 50 and nut 52 are assembled with the valve body 26, and before the ball 32 is inserted within the valve chamber 30, the valve stem 96 is configured in size such that it can be inserted into the valve body via the opening of the valve body 26 that the end adapter in an example threads into. The valve stem 96 is then inserted into the stem orifice 94 and pushed outward through the stem orifice such that the annular abutment 108 on the valve stem catches the interior of the valve chamber 30 at the periphery of the stem orifice to prevent the valve stem from passing outward from the valve body 26 and stem orifice 94. The valve stem 96 may include one or more pressure relief orifices in case pressure of the fluid flowing in the valve chamber 30 exceeds a predefined limit. The valve stem 96 may also include valve stem gaskets 110 received within annular grooves. In this example, two valve stem gaskets 110 are received within two annular grooves that seal the valve stem and help reduce condensation from developing on any electric actuator 100 that may be connected to the valve stem 96 and mounted on the angle ball valve 20. This prevention of condensation from developing is beneficial since condensation could harm operation of the electric actuator 100. The valve stem 96 may include a sealing material that engages the ball and help rotation of the valve stem and ball rotation within the valve chamber 30. The rectangular projection 104 could be dovetail configured and the outer slit 102 could be dovetailed such that the ball is slid onto the dovetailed rectangular projection 104 when the ball is inserted into the valve chamber 30. The valve stem 96 before ball insertion is rotated within the valve chamber 30 into a proper orientation so that the ball may be inserted and the outer slit 102 receives the projection 104.

In a preferred example, each of the first and second gaskets 64,66 operate as the sealing gaskets for the ball 32 and are supported within first and second annular configured sealing seats 60,62. Each gasket 64,66 may be formed from polytetrafluoroethylene (PTFE), otherwise known by the tradename Teflon®, and the hollow ball 32 has a surface coated with PTFE. The gaskets 64,66 situated within the first and second annular configured sealing seats 60,62 are in abutment with the PTFE coated hollow ball 32. This material permits better sliding of the ball relative to the valve body 26 and the end adapter 28. It should be understood that other gasket materials may be used.

Figure 3A:
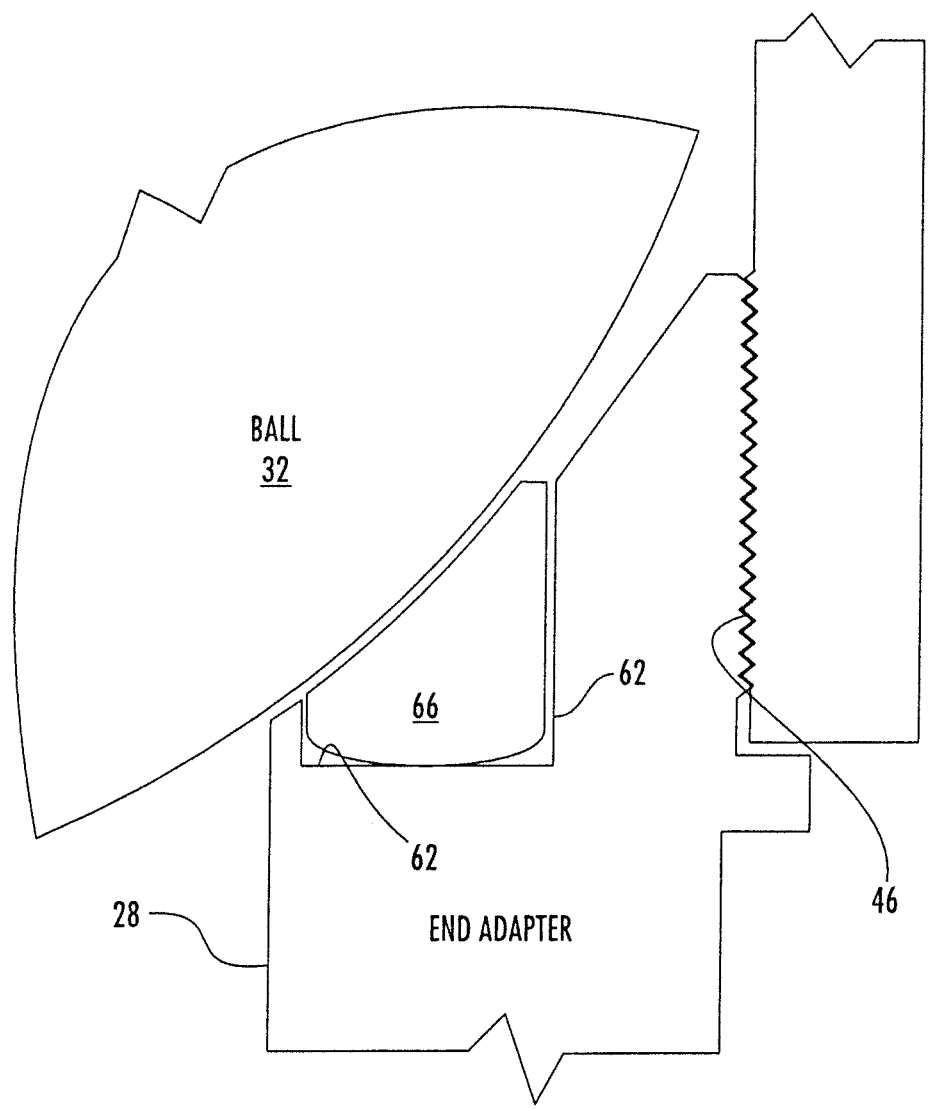
FIG. 3A is an enlarged schematic, partial sectional view of a gasket supported within a sealing seat and the ball engaging the gasket.
Figure 4:
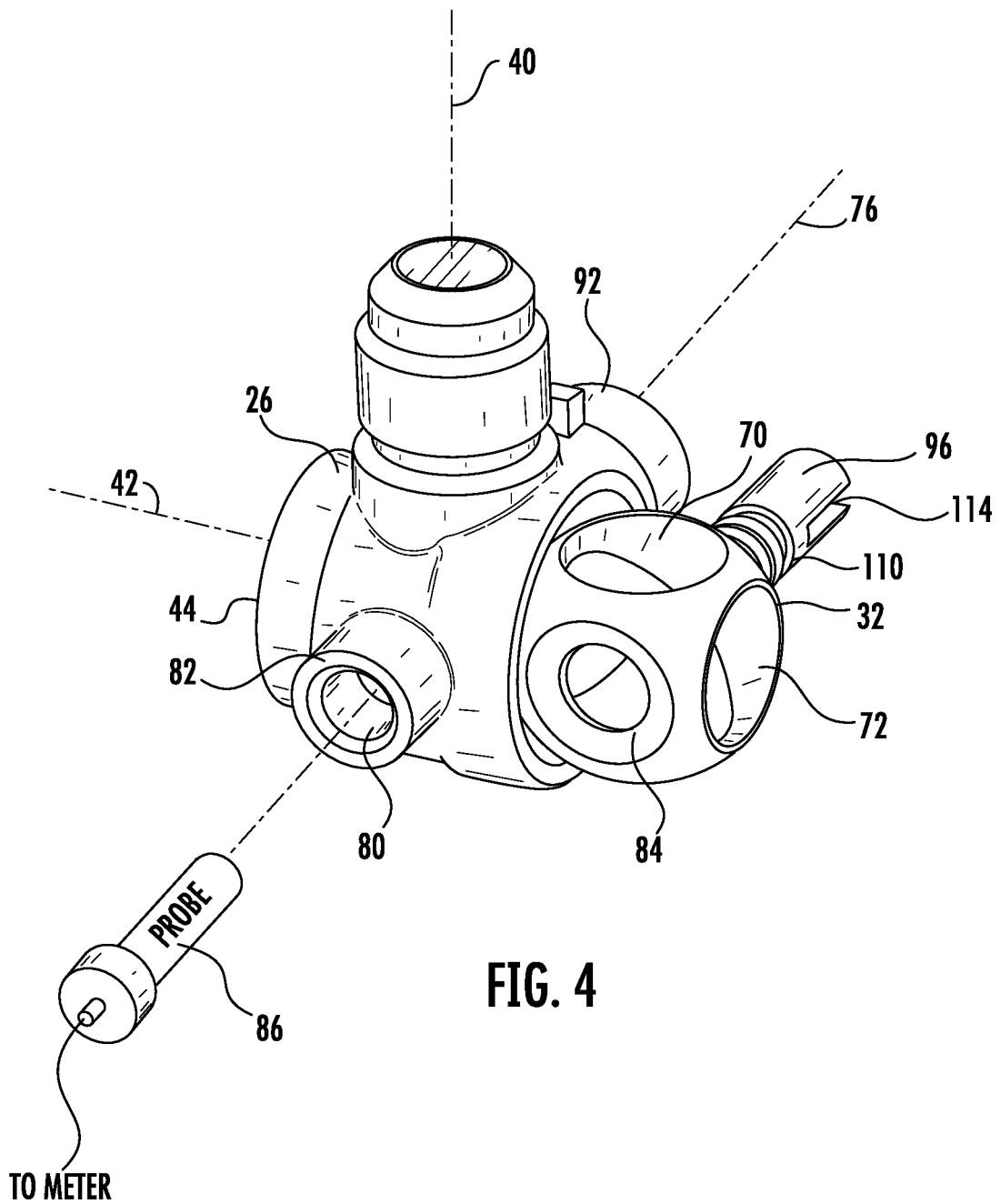
FIG. 4 is an exploded isometric view of a portion of the valve body and ball for the angle ball valve of FIG. 1.
Figure 5:
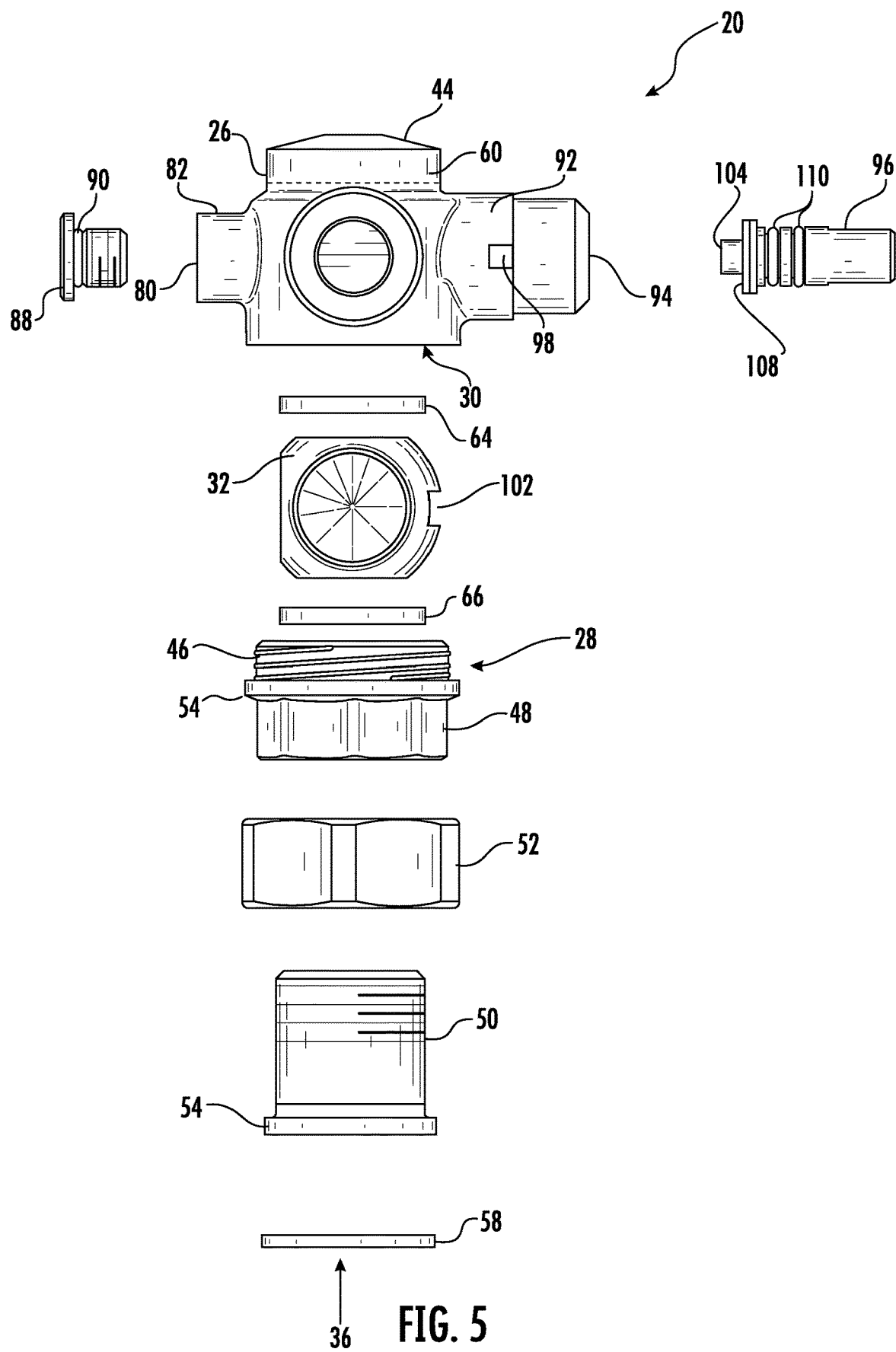
FIG. 5 is an exploded, vertical plan view of the angle ball valve of FIG. 1.
Figure 6:
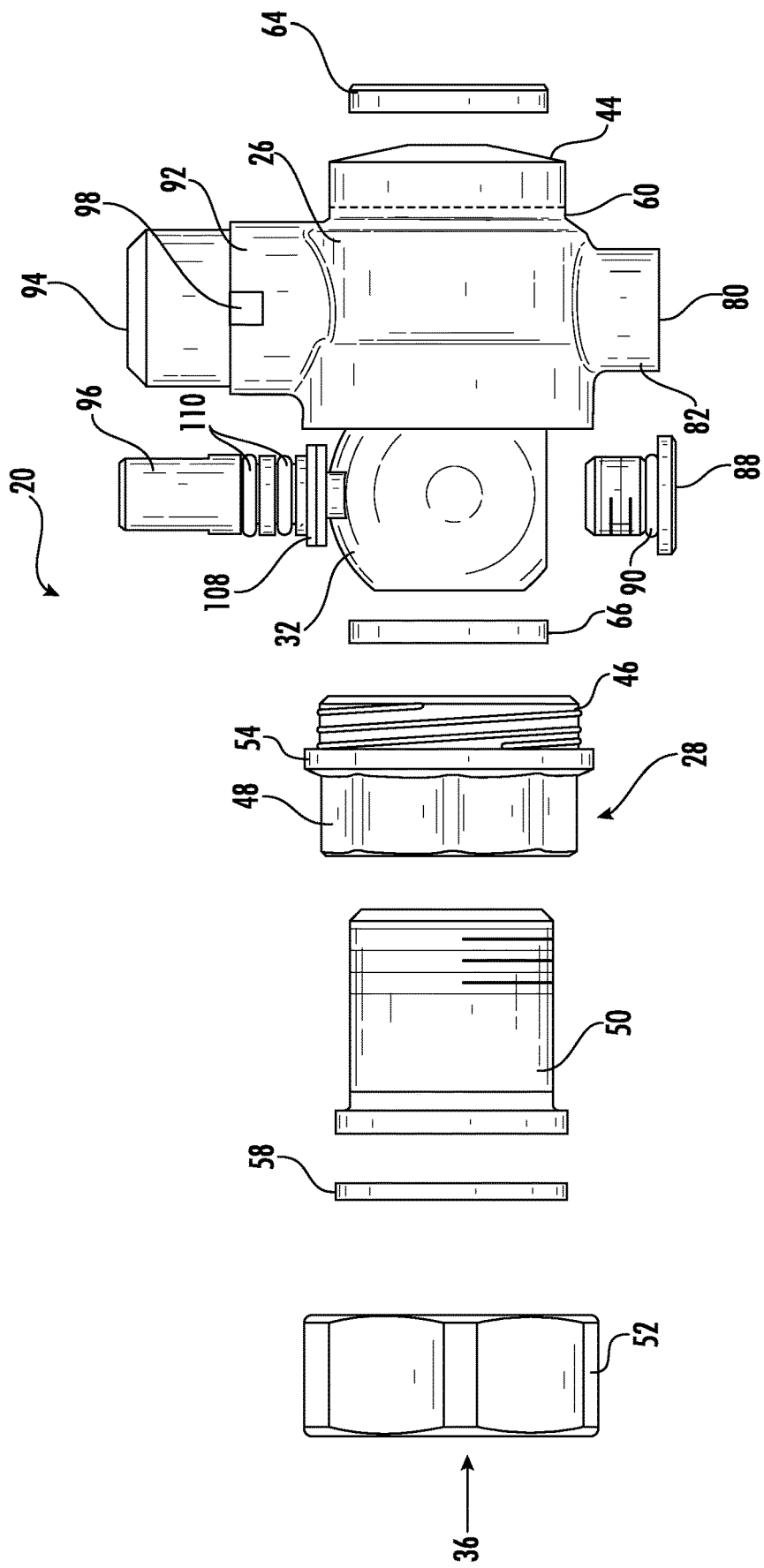
FIG. 6 is another exploded, plan view of the ball valve of FIG. 1.
Figure 7:
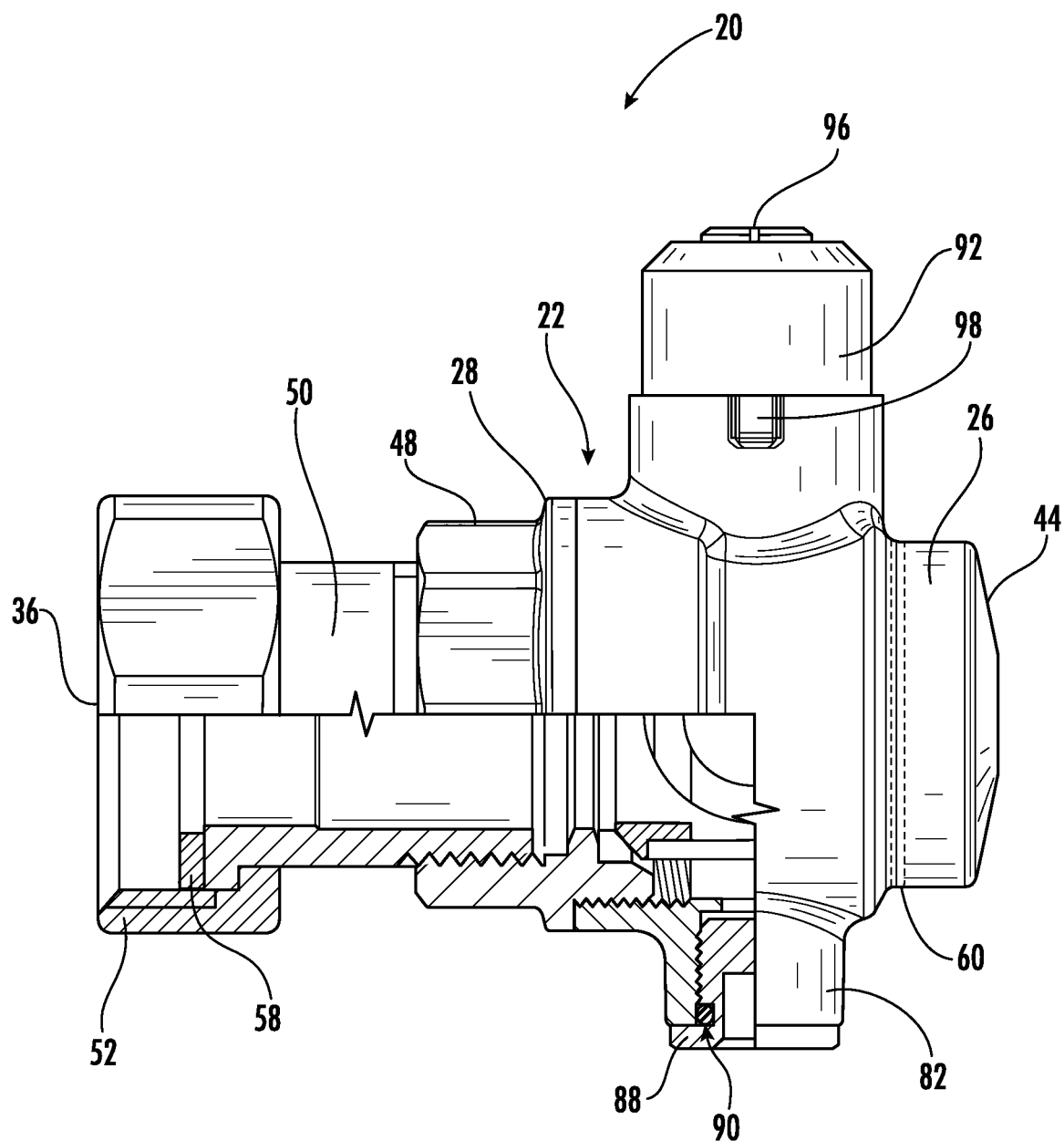
FIG. 7 is a partial sectional view of the angle ball valve of FIG. 1.

The ball 32 in this example is configured as shown in the exploded isometric and plan views of FIGS. 2-6 with cut, planar sections forming the first and second surface openings 70,72, and including the second sensor orifice 84, so that the ball 32 may rotate relatively easy on the first and second gaskets 64,66 without tearing of the gaskets and prolonging the sealing life of the gaskets. Although PTFE is a preferred gasket material and coating used for the ball 32, it should be understood that other materials can be used that reduce friction and provide an adequate sliding action between the ball and the gaskets 64,66. The gaskets 64,66 and the sealing seats 60,62 may be formed to have an angled configuration as shown diagrammatically in FIG. 3A, to maximize surface contact of the PTFE gaskets and the PTFE coated surface of the ball. Also, if there is a gasket failure, this type of angled configuration may reduce the amount of fluid leakage that may occur.

During installation, the valve stem 96 may be inserted and rotated so that the ball outer slit 102 may be slid relative to the rectangular projection 104 and engage the outer slit in the ball such that the ball slides into the valve chamber 30 on the projection. This step of installation can be accomplished manually or via automated assembly equipment. The first gasket 64 will usually be inserted onto the first annular configured sealing seat 60 before inserting the valve stem 96 and before inserting the ball 32. The second gasket 66 is inserted onto the second annular configured sealing seat 62 in the end adapter 28, which is then screwed into the valve body 26 after the ball 32, as a floating ball, had been inserted within the valve chamber 30 of the valve body 26 and positioned at the valve seat, i.e., in abutment with the first gasket 64. The joint member 50 may already have been inserted on the end adapter 28 and have the nut 52 thereon and be press fit into the opposing end of the end adapter or screwed therein. The nut 52 had been inserted over the joint member 50 before the joint member is secured within the end adapter 28. The nut 52 is retained by the lower circumferential ridge 54, or shoulder and internal shoulder or lip 56 that engage each other. The gasket 58 may be received over the joint member 50 or engage the lower edge in this example, and the BTU meter directly connected in an example.

Figure 8:
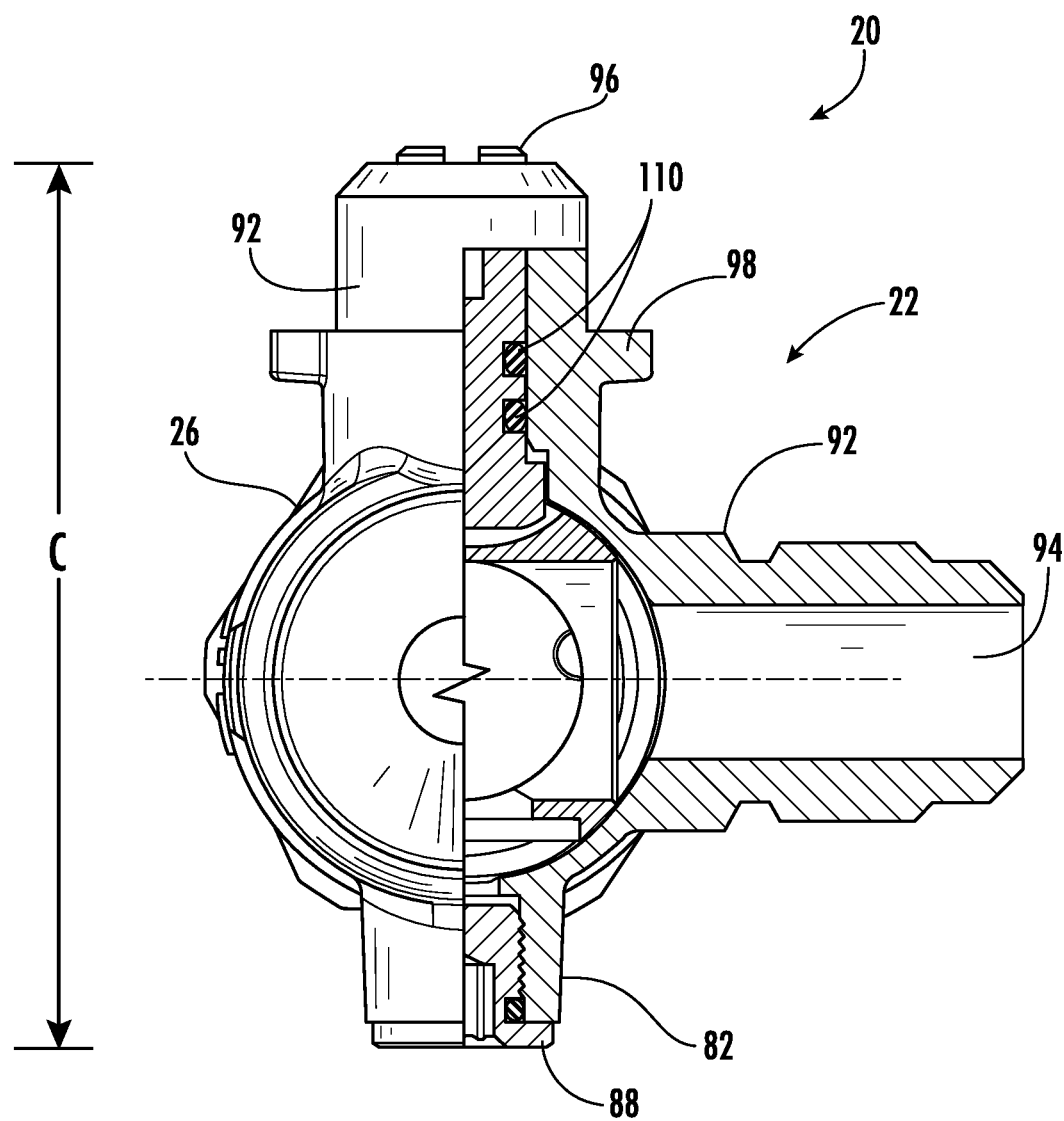
FIG. 8 is another partial sectional view of the angle ball valve of FIG. 1.

The angle ball valve 20 can be configured with different dimensions, but in one example, corresponds to a DN19 valve and the dimensions from the end of the stem orifice 94 to the other end of the angle ball valve 20 is about 70 millimeters as shown by dimension C in FIG. 8. Other dimensions of the angle ball valve 20 are relative to that overall dimension, and of course, dimensions can vary depending on end use applications. The valve stem 96 end opposite the rectangular projection 104 that engages the outer slit 102 may include a drive slot 114 to receive a driven section of an electric actuator 100 to drive or rotate the valve stem and, in turn, rotate the ball 32.

As illustrated, the ball 32 includes the first and second surface openings 70,72 that define fluid ports, but the ball may also be cut with a planar section to include another surface opening and form a third opening 120 as shown in FIG. 3, which may provide better rotation of the ball relative to the gaskets 64,66 and provide an additional opening so that a different rotation of the valve stem may rotate the ball into an open valve position. It should also be understood that the different components of the angle ball valve 20 may be made from different metallic and plastic materials, injection molded plastic or metal parts, or powdered or sintered metal.

Figure 9:
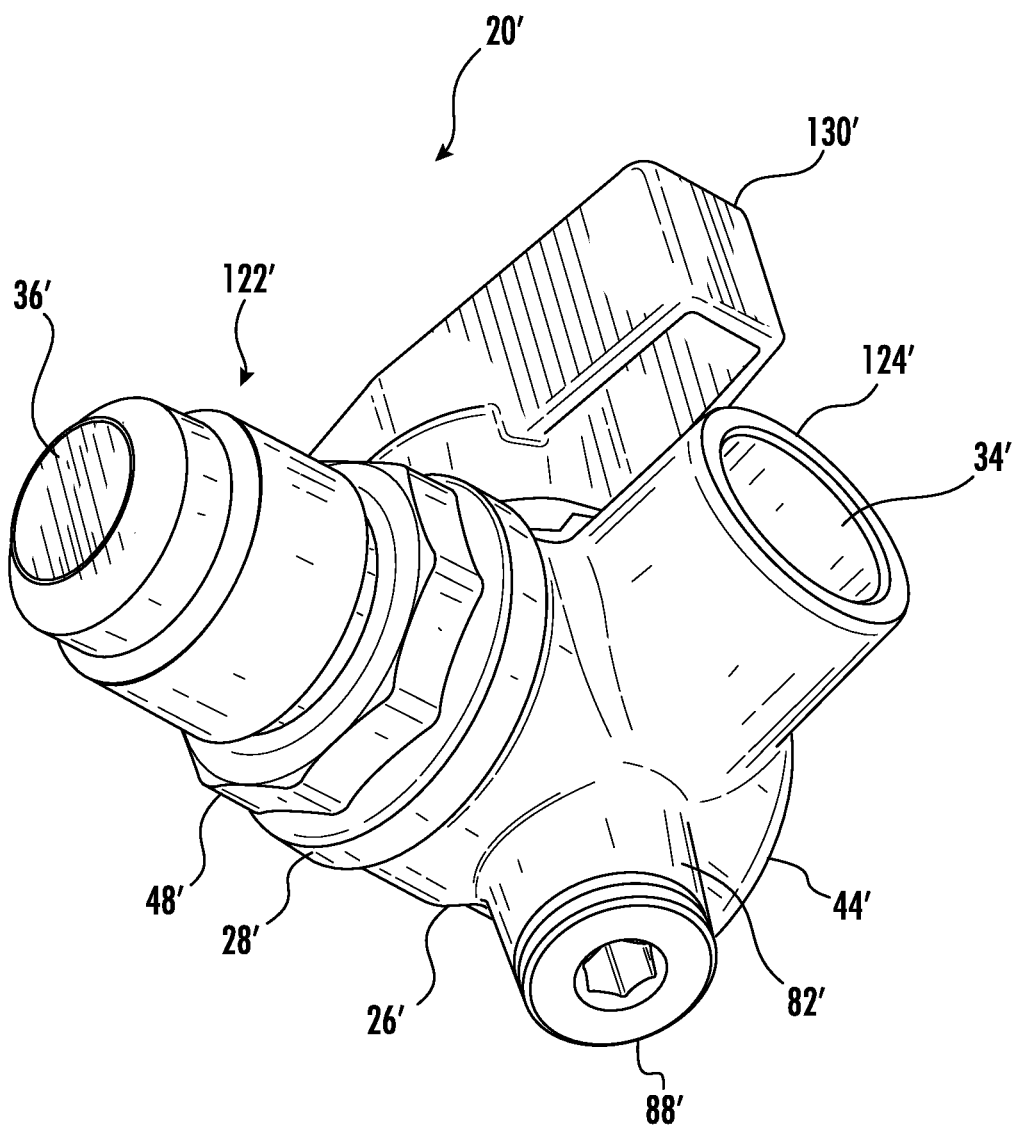
FIG. 9 is an isometric view of a second embodiment of the angle ball valve that employs a manual handle as an isolation angle ball valve.
Figure 10:
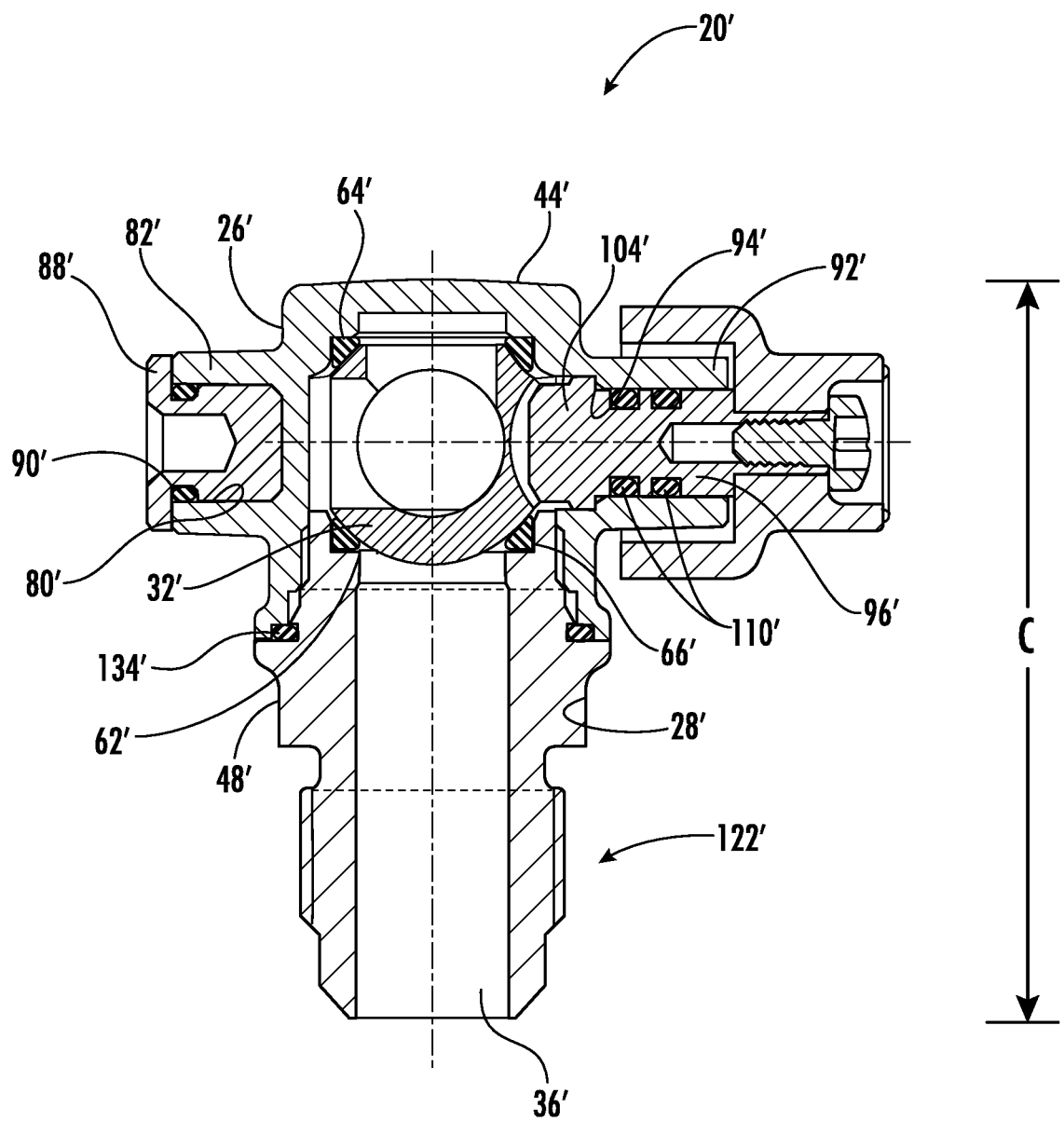
FIG. 10 is a sectional view of the angle ball valve of FIG. 9.

Referring now to FIGS. 9 and 10, there is illustrated a second embodiment of the angle ball valve 20' that is configured as an isolation angle ball valve and with reference numbers given in prime notation. This isolation angle ball valve 20' also includes the side mounted first sensor orifice 80' and the opposing and side mounted stem orifice 94', but with the valve stem 96' connected to a manual handle illustrated generally at 130'. In the horizontal position shown in FIG. 9, the angle ball valve 20' is in the closed ball valve position, and when the handle 130' is turned vertically, the angle ball valve is in the open ball valve position, allowing fluid flow between the first and second fluid ports 34',36'. The isolation angle ball valve 20' includes a valve body 26' and end adapter 28', which also includes the second annular configured sealing seat 62' and second gasket 66'. In this example of the isolation angle ball valve 20', the end adapter 28' is configured as a flared end connection 122' that may connect to a flexible hose or pipe that extends to a control valve or a BTU meter as non-limiting examples. The inlet 124' in this example isolation angle ball valve 20' may connect to a building riser, such as the vertical copper risers often found in high rise residences or office complexes. The connection to the riser may be made using a sweat or FNPT end connection, which may include female internal threads as is typical for this type of connection.

The isolation angle ball valve 20' in this example may be assembled using a similar assembly technique as with the angle ball valve 20' of FIGS. 1-8. The valve body 26' in the isolation angle ball valve 20' may include the first annular configured sealing seat 60' adjacent the closed end 44', and a first gasket 64' is inserted first onto the first annular configured sealing seat 60'. That step may be followed by the insertion of the valve stem 96' and then insertion of the ball 32', followed by screwing the end adapter 28' having the second gasket 66' into the valve body 26'. Once that step is accomplished, the ball 32' floats on the valve seat formed by the gaskets 64',66', and in abutment with the first and second gaskets, and may be rotated into open and closed positions by turning the manual handle 130' attached to the valve stem.

In the example of this manually operated isolation angle ball valve 20' of FIGS. 9 and 10, a screw may be used to secure the handle 130' into the valve stem 96', which in this example is configured shorter than the valve stem in the first embodiment, but may still include two O-rings to provide a seal. The end adapter 28' may also include a sealing ring 134' that seals the end adapter once screwed into the valve body 26'. The end adapter 28' in this second embodiment may be formed as a one piece unit, instead of having a separate joint member and nut as in the first embodiment. The total overall dimension shown by the dimension C in FIG. 10 could be about 62.5 millimeters with a DN11 size isolation angle ball valve 20' with relative dimensions for the overall configuration. This is only one non-limiting example of dimensions and the isolation angle ball valve 20' may be configured in different sizes and dimensions depending on end use application.

The two embodiments of the angle ball valve 20 and isolation angle ball valve 20' may have different features with the embodiment shown in FIGS. 1-8 having a lubricant such as grease and being operative in temperature from −20° C. to about 100° C., while the embodiment of the isolation angle ball valve 20' shown in FIGS. 9 and 10 may operate from −20° C. up to 150° C. and use a silicone lubricant, and have a stem rotation of about 90°.

Figure 11:
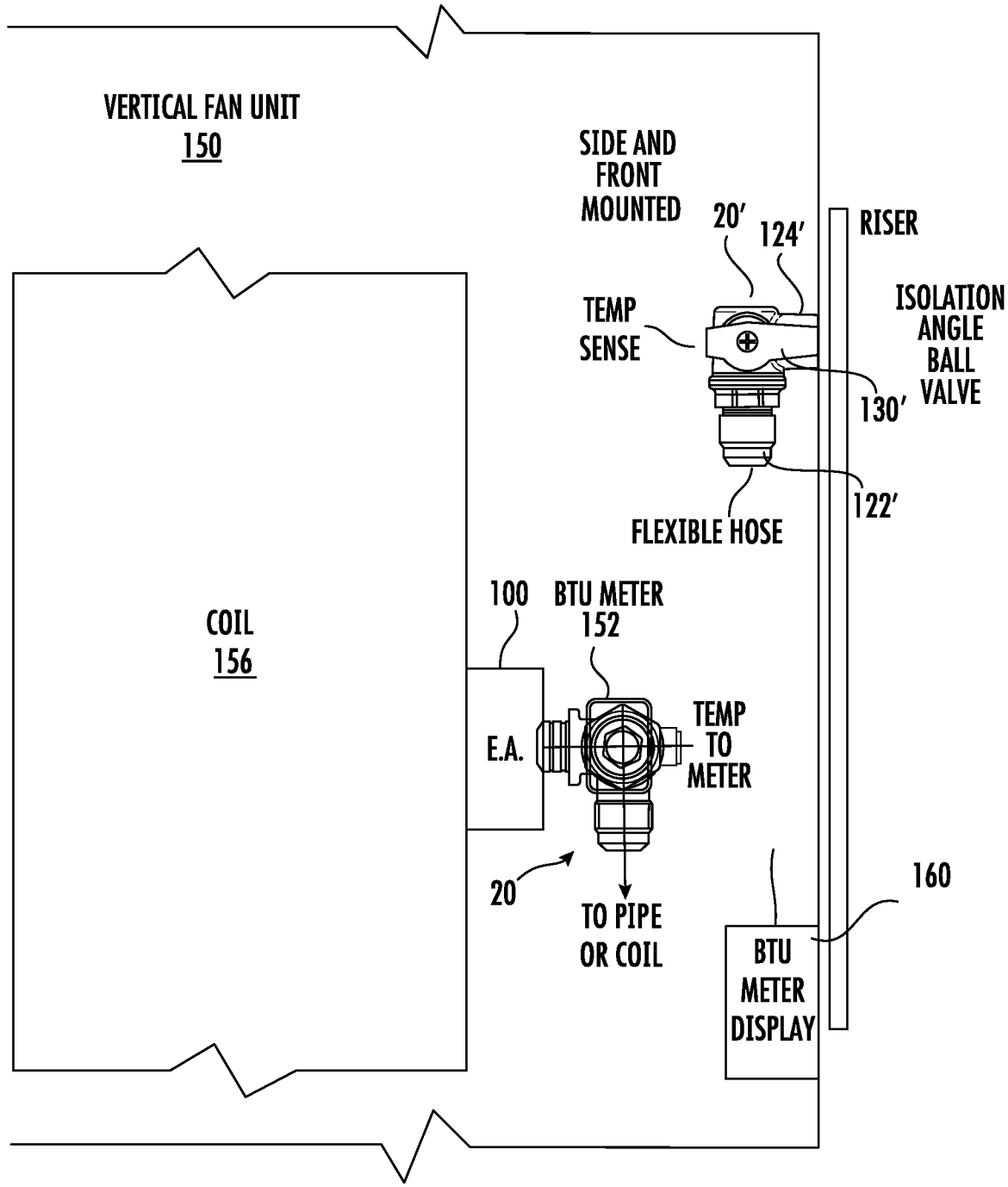
FIG. 11 is a schematic drawing of a vertical fan unit showing use of the angle ball valve.

An example installation for a vertical fan unit 150 as part of a HVAC system is shown schematically in FIG. 11. In this example, the isolation angle ball valve 20' is moved to the side of the vertical fan unit and positioned to the front so the valve handle 130', which is located not on top, but on the side, is easily accessible. The isolation angle ball valve 20' is positioned so that the manual valve handle 130' faces the front and may be easily accessible when, for example, a perimeter return air intake as a panel door is removed in order for a maintenance technician to access the interior of the vertical fan unit 150. The inlet 124' of the isolation angle ball valve 20' such as corresponding to the first fluid 34' port, may connect to a building riser, e.g., vertical copper risers, such as Type M or Type L copper risers as non-limiting examples, using a sweat or FNPT end connection. The other flared end, in this example corresponding to the second fluid port 36' may connect directly to a flexible hose that extends to a control valve, or depending on the end use and application, to a BTU meter.

In this example of the vertical fan unit 150, the installation also includes an angle ball valve 20 of the type shown the embodiment of FIGS. 1-8, where the angle ball valve connects directly to the BTU meter 152 without a requirement for fitting or hoses, and the temperature sensor 86 may be integrated in the angle ball valve 20 to allow the BTU meter to measure the temperature discrepancy between the supply and return. The electric actuator 100 may be connected by a quick connection with the valve stem 96 and the gasket 110 as a seal reduces the condensation transfer from the fluid media flowing in the angle ball valve 20 and the drive member of the electric actuator 100, which opens and closes the valve 20 by automatically rotating the valve stem. There may be a direct connection of this angle ball valve 20 to a hose for the coil or for a manual isolation valve. The angle ball valve 20 may be placed beside the coil 156 so there is reduced air friction in the air duct when the air blows in the air duct, and in this example, over the coil. The electric actuator 100 may be installed on the side of the coil 156 to avoid obstruction resulting from high air friction or high head loss. A BTU meter display 160 may be secured to the inside wall of the air duct to reduce friction and obstruction, and the BTU meter 152 with a hydronic part may be connected to the angle ball valve 20 and installed in-line with a pipe in an example. A nut and tail end connection on the angle ball valve 20 may be provided as described relative to the embodiment in FIG. 1 to allow direct connection to the BTU meter.

Other examples and embodiments for the angle ball valve 20, including the isolation angle ball valve 20', may be used in different engineering environments to solve problems that those skilled in the art will confront with different system installations. The angle ball valve 20,20' as described may be advantageously used with a manual valve handle 130' or electric actuator 100, which is positioned on the side of the valve body 26,26' and coaxial with the temperature sensor 86 as a straight probe on the other side, such that the sensor will not interfere with the ball 32 rotation. The design as described allows use of a ball hole or surface opening at the lower section of the ball corresponding in this example to adjacent the second fluid port 36, instead of having a cut and slotted section of the ball that extends around the outer surface or periphery of the ball such as in some prior art examples as in the Korean '269 patent. The angle ball valve 20 uses a second sensor orifice 84 that requires a smaller diameter orifice that is only slightly larger in diameter than the temperature sensor 86, which is received in the first sensor orifice 80. This configuration with the ball 32 and its openings 70,72 that cooperate with the fluid ports 34,36 together with the unique position of the annular configured sealing seats 60,62 and gaskets 64,66 reduces stress on gaskets and reduces the chances the ball will be driven out of alignment. There is no reduction in the angle ball valve operation and the reduced gasket or gasket wear reduces the chance of gasket tear or damage, which could increase fluid leakage. The assembly of this angle ball valve 20 is easier and can be automatically accomplished using automated machinery, as compared to some prior art designs that require careful, manual assembly. The ball 32 that is used as the floating ball and the different components, such as the valve body 26 and end adapter 28, may be produced from carbon steel, stainless steel, titanium and other metallic components, or from other materials such as nylon, carbon fiber, plastic, or other materials. Injection molded metallic or plastic materials can be used. Different electric actuators may be used with the angle ball valve.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:
1. A vertical fan unit for a heating, ventilation and cooling (HVAC) system, comprising:
 a housing having an air duct and a fan unit and a coil contained within the air duct, a fluid supply and fluid return, and an access panel door that permits access to the fan unit, coil, fluid supply and fluid return;
 an angle ball valve contained within the housing adjacent the coil to reduce air friction within the air duct and connected between the fluid supply and fluid return, the angle ball valve comprising:
  a valve housing having a valve chamber and first and second fluid ports formed within the valve housing and communicating with the valve chamber and defining a fluid path between the first and second fluid ports, said first and second fluid ports disposed substantially normal to each other and oriented along respective first and second longitudinal axes forming a first transverse plane to the valve housing, said valve housing having a closed end opposite the second fluid port;
  first and second annular configured sealing seats formed within the valve housing at the valve chamber and concentric to the second longitudinal axis, the first sealing seat adjacent the closed end of the valve housing and the second sealing seat adjacent the second fluid port;
  a sealing element positioned at each annular configured sealing seat;
  a hollow ball disposed within the valve chamber and in abutment to the sealing elements, said ball having a first surface opening and second surface opening and being rotatable within the valve chamber about an axis of ball rotation that is transverse to first and second longitudinal axes between open and closed ball valve positions, wherein in the open ball valve position, the first surface opening is aligned with the first fluid port and the second surface opening is aligned with the second fluid port to allow fluid flow between the first and second fluid ports through the ball, and in the closed ball valve position fluid flow is prevented between the first and second fluid ports;

a first sensor orifice formed within the valve housing coaxial with the axis of ball rotation, said ball having a second sensor orifice;

a temperature sensor received within the first sensor orifice and extending into the second sensor orifice of the ball for sensing the temperature of fluid flowing between the first and second fluid ports when the ball is rotated into the open ball valve position and measuring a temperature discrepancy between the fluid supply and fluid return;

a stem orifice formed within the valve housing opposite the first sensor port and coaxial with the axis of ball rotation;

a valve stem received within the stem orifice and operatively connected to the ball, wherein said valve stem is rotatable to rotate the ball into and out of the open and closed ball valve positions; and a BTU meter mounted at the second fluid port and connected to the temperature sensor.

2. The vertical fan unit according to claim 1 further comprising a building riser adjacent a side of the housing and an isolation angle ball valve positioned at the side of the housing and connected to the building riser and communicating for fluid flow to the first fluid port of the angle ball valve.

3. The vertical fan unit according to claim 1 further comprising an electric actuator mounted on the coil and connected to the valve stem of the angle ball valve to control rotation of the ball between open and closed ball valve positions.

4. The vertical fan unit according to claim 1 wherein said BTU meter is positioned on a side of the coil and accessible via the access panel door.

5. The vertical fan unit of claim 1, wherein the first fluid port is configured as a fitting adapted to connect to a hose of the coil or an isolation valve of the heating, ventilation, and cooling (HVAC) system.

6. The vertical fan unit of claim 1, wherein the second fluid port is configured as a fitting to connect to the BTU meter.

7. The vertical fan unit of claim 1, wherein the first and second fluid ports are angled about 90 degrees to each other along respective first and second longitudinal axes that are transverse to each other.

8. The vertical fan unit of claim 1, wherein the axis of ball rotation defines a third longitudinal axis that is transverse to first and second transverse longitudinal axes, wherein said longitudinal axes define respective x, y and z axes.

9. The vertical fan unit of claim 1, wherein the fluid comprises a gas or liquid.

10. The vertical fan unit of claim 1, wherein the ball includes a periphery having an outer slit, and said valve stem includes a projection that engages the outer slit for rotating the ball along the axis of ball rotation.

11. The vertical fan unit of claim 1, wherein the valve stem includes an annular abutment positioned within the valve chamber that engages a periphery of the stem orifice within the valve chamber to prevent removal of the valve stem outward from the valve housing.

12. The vertical fan unit of claim 1, further comprising the temperature sensor received within the first sensor orifice and extending into the second sensor orifice of the ball for sensing the temperature of fluid flowing through the ball when in the open ball valve position.

13. The vertical fan unit of claim 1, wherein each sealing element comprises a gasket.

14. The vertical fan unit of claim 13, wherein each gasket comprises Polytetrafluoroethylene (PTFE) and said ball has a surface coated with PTFE.

* * * * *